MAGNETIC CROSS-FIELD DEVICES AND CIRCUITS

Filed Oct. 24, 1962 2 Sheets-Sheet 1

INVENTOR
ORESTES M. BAYCURA
BY Leo J. Aubel
ATTORNEY

United States Patent Office 3,275,842
Patented Sept. 27, 1966

3,275,842

MAGNETIC CROSS-FIELD DEVICES AND CIRCUITS

Orestes M. Baycura, Irwin, Pa., assignor to International Business Machines Corporation, New York, N.Y., a corporation of New York Filed Oct. 24, 1962, Ser. No. 232,773
1 Claim. (Cl. 307—88)

This invention relates to magnetic cross-field devices and circuits and particularly to improved devices operating in accordance with magnetic cross-field phenomena, and to logic circuits comprising said devices.

It has been found that in magnetic devices, if a magnetic flux field is developed which has lines of force which are in a given direction, and if a second magnetic flux field is developed which has lines of force which traverse and have components orthogonal to the lines of force of the first field, then the magnetic strength of the first field is a function of the second field. More specifically, if such a second magnetic field *is applied* to a magnetic device, the strength of the first magnetic field for given conditions will increase relatively slowly to a relatively low magnitude; whereas if the second magnetic field *is not applied,* the strength of the first magnetic field for the same conditions will increase relatively quickly to a relatively much higher magnitude.

Accordingly, it is a principal object of the present invention to provide improved devices operating in accordance with magnetic cross-field phenomena.

It is another object of the present invention to provide logic circuits formed in accordance with magnetic cross-field phenomena.

It is another object of the present invention to provide improved "AND" and "OR" logic circuits formed in accordance with magnetic cross-field phenomena.

It is another object of the present invention to provide improved logic circuits of high reliability.

In the attainment of the foregoing objects, I provide a magnetic device operating in accordance with cross-field phenomena. A plurality of these magnetic devices may be arranged to provide logical circuits of the "AND" and "OR" types in which magnetic cross-fields are utilized to provide the "AND" and "OR" functions.

In a basic device or structure according to the invention, a magnetic field, a so-called magnetic cross-field, is provided by passing a current through a conductor having a magnetic coating formed on its periphery; the lines of force of the magnetic cross-field will be transverse to the axis of the conductor. Another magnetic field having lines of force which extend along the axis of the conductor is provided by passing a current through a winding wound transverse to the axis of the conductor. By controlling the flow of the current through the conductor, and thus the magnetic cross-field, an output signal is obtained on an output winding, which output signal is a function of the interaction of the two fields. Thus, a group of basic devices may be arranged in a circuit to provide the logic "AND" and "OR" functions.

A computer system utilizing magnetic logic would offer reliability and economy of cost; this invention provides basic "AND" and "OR" circuits based on the cross-field phenomena in magnetic devices, which circuits are suitable for operation in such a computer system.

The foregoing and other objects, features and advantages of the invention will be apparent from the following more particular description of preferred embodiments of the invention, as illustrated in the accompanying drawings, in which like characters refer to like elements throughout.

Figure 6A:
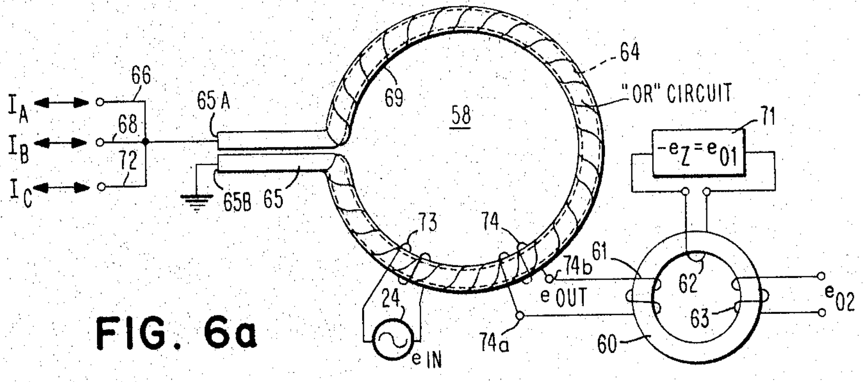
Figure 6B:
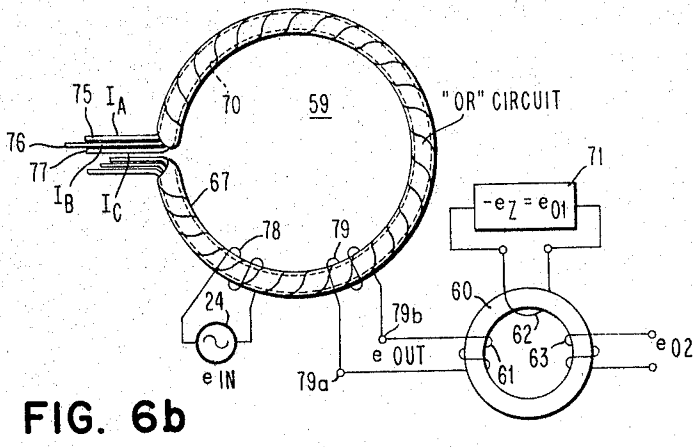

FIG. 6*a* is a schematic showing of a logic "OR" circuit formed in accordance with the invention;

FIG. 6*b* is a schematic showing of an alternative embodiment of a logical "OR" circuit in accordance with the invention.

Figure 1:
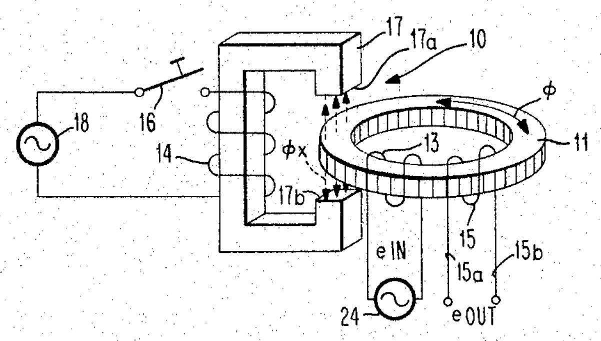
FIG. 1 shows a schematic drawing of a structure for illustrating a cross-field phenomena.

The magnetic cross-field phenomena is illustrated in FIG. 1, which shows a magnetic structure or device 10 including a toroid 11 of magnetic material. A first winding 13 and a second or output winding 15 are wound on the toroid 11. Note that the configuration of the toroid 11 and the included windings 13 and 15 are essentially that of a standard transformer. The toroid 11 is mounted within the opening of a C-shaped electromagnet 17. A winding 14 is wound around the bight or intermediate portion of the electromagnet 17; the winding 14 is connected through a switch 16 across a source of alternating current potential 18. A second source 24 of alternating current potential or voltage is connected to winding 13 to cause an alternating current to flow through winding 13. As is known, a current flowing through winding 13 develops a magnetic flux field $\phi$ in toroid 11. During one half cycle of an alternating current flowing in winding 13, the lines of force of the magnetic flux field $\phi$, which are indicated by the double arrowed line shown on toroid 11, will traverse toroid 11 in a clockwise direction; and, during the other half cycle of the alternating current flowing through winding 13, the lines of force of the flux field will traverse toroid 11 in a counterclockwise direction.

When the switch 16 is closed and an alternating current is caused to flow through the winding 14 of electromagnet 17, the current flowing through winding 14 will develop a magnetic flux field having lines of force which traverse the air gap between the open ends **17*a* and 17*b* of electromagnet 17. For purposes of this discussion, this magnetic field developed in the air gap between the open ends 17*a* and 17*b* of electromagnet 17 will be designated as a magnetic cross-field $\phi_X$. During one half cycle of the alternating current flowing through winding 14, the lines of force of magnetic cross-field $\phi_X$, which are indicated by the dotted and arrowed lines in FIG. 1, will be directed downward (as oriented in the drawing); and, during the second half cycle of the current flowing through winding 14, the lines of force of the magnetic cross-field $\phi_X$ will be directed upward (as oriented in the drawing). The lines of force of the magnetic cross-field $\phi_X$ will thus be transverse to, or in a direction normal to, the lines of force of the magnetic field $\phi$, which is developed in toroid 11. It has been found that for purposes of the magnetic cross-field phenomena, the exact phase relation between the alternating current in winding 13 and the alternating current in winding 14** is not particularly critical.

Figure 2:
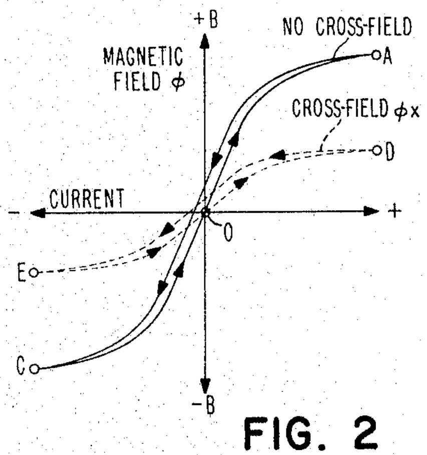
FIG. 2 is a hysteresis type graph useful in explaining the operation of the structure of FIG. 1.

The relationship or interaction of the magnetic cross-field $\phi_X$ and the magnetic field $\phi$ during the two conditions, that is, when a magnetic cross-field $\phi_X$ *is,* and when the magnetic cross-field $\phi_X$ *is not* applied, has been found to be that as shown in FIG. 2. Referring to the graph of FIG. 2, the relative amplitude of the current flowing in winding 13 is indicated along the axis of the abscissa; and the relative strength $\beta$ or B of the magnetic field $\phi$ developed in toroid 11 by the current flowing in winding 13 is indicated along the axis of the ordinate.

First, assume that an alternating current is coupled to winding 13 from source 24 to develop a magnetic field $\phi$ in toroid 11 and that switch 16 is opened such that no current flows in winding 14 and therefore no magnetic cross-field $\phi_x$ is developed. Under these conditions and during the positive half cycle of the current flowing through winding 13, the magnetic field $\phi$ in toroid 11 will increase its magnetic strength B relatively sharply from an initial or 0 (zero) reference to a relatively high point A as indicated by the solid line labeled "No Cross-Field" in FIG. 2. Likewise, during the negative half cycle of the alternating current flowing through winding 13, the magnetic strength of the magnetic field $\phi$, which could now be indicated by *a—B,* increases relatively sharply toward a point C, as also shown by the solid line in FIG. 2. As is known, the solid line graph of FIG. 2 is essentially retraced during the succeeding alternating cycles of the current flowing in winding 13.

Assume next that all the conditions are the same as before except that switch 16 is now closed to cause a current to flow through winding 14 to thus develop a magnetic cross-field $\phi_x$. During the positive half cycle of the alternating current flowing through winding 13, the magnetic field $\phi$ will increase relatively slowly and to a relatively much lower magnetic strength at point D as indicated by the dotted line labeled "Cross-Field $\phi_x$" in FIG. 2. Likewise, on the negative half cycle of the alternating current flowing through winding 13 the magnetic strength —B of the magnetic field will increase relatively slowly toward point E, as indicated by the dotted line of FIG. 2. The dotted line graph of FIG. 2 is essentially retraced during the succeeding alternating cycles of the current flowing in winding 13.

Note that in the graph of FIG. 2 there are no specific numerical relations shown, but rather a relative picture of the increase in the magnetic field $\phi$ is shown for the two conditions; that is, for the condition when a magnetic cross-field $\phi_x$ *is not* applied and when a magnetic cross-field $\phi_x$ *is* applied.

The output signal *e* OUT which will be obtained across leads **15*a* and 15*b* of the output winding 15 on toroid 11** of FIG. 1 under the foregoing two conditions can be approximately described by the following equations:

*Equation 1*

$$e\ \mathrm{OUT}-1=\frac{E\ \mathrm{OUT}}{\sqrt{1+\left(\frac{\phi_x}{\phi}\right)}}$$

where:

$E$ OUT$=Nd\phi dt=$the voltage output developed across the winding 15 when the cross-field $\phi_x$ *is not* present;

$e$ OUT—1=the output developed across winding 15 when a cross-field $\phi_x$ *is* present;

$\phi_x$=the magnetic cross-field;

$\phi$=the magnetic field developed in toroid 11.

In non-dimensional terms Equation 1 can be rearranged as follows:

*Equation 2*

$$\frac{e\ \mathrm{OUT}-1}{E\ \mathrm{OUT}}=\frac{1}{\sqrt{1+\left(\frac{\phi_x}{\phi}\right)}}$$

Figure 3:
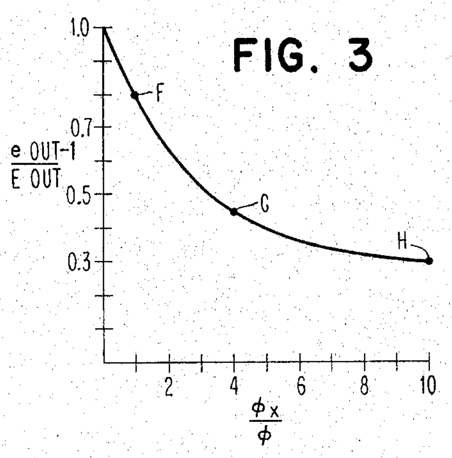
FIG. 3 is another graph useful in explaining the operation of the structure of FIG. 1.

The plot of Equation 2 is shown in FIG. 3; the ratio $\phi_x/\phi$ is shown along the axis of abscissa and the output voltage ratio *e* OUT—1/*E* OUT is shown along the axis of ordinates.

FIG. 3 shows that a high ratio of $\phi_x/\phi=10$ is required to decrease the output voltage ratio *e* OUT—1/*E* OUT from 1 to about the 30% or 0.3 point labeled H in FIG. 3; that is, the magnitude of the magnetic cross-field $\phi_x$ must be ten times larger than the magnitude of the magnetic field $\phi$ to reduce the ratio of the output voltage

*e* OUT—1/*E* OUT by 70%. However, by utilizing a structure in accordance with the invention, as will be explained herein below, the ratio of $\phi_x/\phi$ can be minimized to, for example, a ratio of about 4 and 1 at points G or F, respectively in FIG. 3 while still obtaining a resolution of output signals suitable for use in logic circuitry.

Figure 4:
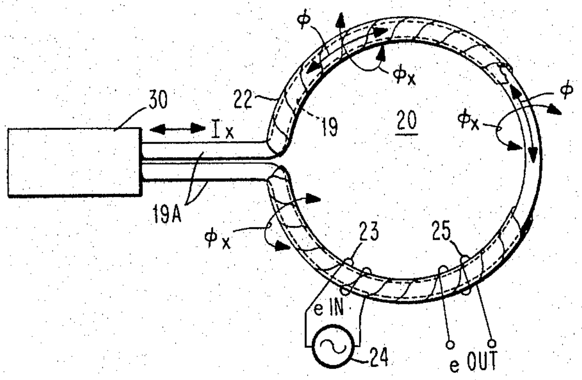
FIG. 4 is a schematic showing of one embodiment of a device in accordance with the invention, in which the cross-field phenomena is utilized.

FIG. 4 shows a cross-field device and circuitry 20, formed in accordance with the invention and which comprises a length of a conductor or conductive wire 19A formed or arranged as a toroid 19. The ends or terminals of the wire 19A forming toroid 19 are coupled to a suitable source 30 of alternating current which, for purposes of this description, may be considered as an input signal current $I_x$. A coating or layer of magnetic material 22 is wound in a helical configuration along the length of the toroid 19. The coating of magnetic material 22 should have no air gaps along its length to maximize the magnetic cross-field effect as discussed above.

Instead of a coating of magnetic material 22, a tape of any suitable magnetic material may be wound in a helical configuration along the length of toroid 19; the tape or magnetic material is preferably insulated from the toroid 19. For purposes of this explanation, it will be assumed that a toroid 19 has a coating of magnetic material formed thereon; in either case, that is, whether a coating of magnetic material or a magnetic tape is used, the operation of the circuit is the same.

Since toroid 19 has the magnetic material 22 coated thereon, the signal current $I_x$ flowing through toroid 19 will develop a magnetic cross-field $\phi_x$ having lines of force which are normal to the axis of toroid 19, as indicated by the arrowed lines drawn around the axis of toriod 19 in FIG. 4.

A first winding 23 and a second or output winding 25 are arranged in spaced relation to one another and are each wound around a length of the wire forming toroid 19. A suitable alternating current source 24 is connected across winding 23. The source 24 couples a voltage *e* IN to winding 23 to cause an alternating current to flow through winding 23. For purposes of this description, the alternating current flowing through winding 23 may be considered as a driver or driving current. The driving current flowing in winding 23 will induce a magnetic flux field $\phi$ in toroid 19; magnetic field $\phi$ has lines of force which extend along and are parallel to the axis of the toriod 19, as indicated by the double arrowed lines of FIG. 4.

The instantaneous directions or polarities of the lines of force of the magnetic field $\phi$ and of the magnetic cross-field $\phi_x$ are dependent on the cycle of the respective driving and signal currents which develop these fields, as discussed above; and, as also discussed above, the phase relation between these two currents is not particularly critical in the operation of the circuit of the invention. The interaction or relation of the magnetic cross-field $\phi_x$ and the magnetic field $\phi$ in FIG. 4 are equivalent to that shown in FIG. 1; however, the device of FIG. 4 is arranged to have a relative small path length for producing the most effective magnetic cross-field $\phi_x$ as discussed above with reference to FIG. 3.

The amplitude of the signal current $I_x$ flowing through toroid 19 controls the magnitude of the output voltage *e* OUT developed across output winding 25 by a given input voltage *e* IN coupled to input winding 23. More specifically, if the signal current $I_x$ flowing through toroid 19 is of a relative maximum amplitude, the magnetic cross-field $\phi_x$ developed in toroid 19 will be of a relatively high strength or magnitude. Under these conditions, a given input voltage *e* IN impressed across winding 13 and the resulting current flow in winding 13 will develop a magnetic field $\phi$ of a relatively low magnitude in toroid 19 (see again, the dotted lines in FIG. 2); consequently, a relatively low output voltage $e$ OUT will be developed across output winding 25. Conversely, if the amplitude of the signal current $I_x$ flowing through toroid 19 is zero or is relatively low, the magnetic cross-field $\phi_x$ developed in toroid 19 will be non-existent or of a relatively low magnitude; and, if the same given input voltage $e$ IN is impressed across winding 13, then a relatively high output voltage $e$ OUT will be developed across output winding 25 (see the solid line in FIG. 2).

"AND" CIRCUIT

In accordance with the invention, logic circuits are formed by utilizing the basic device 20 shown in FIG. 4. For example, FIG. 5 shows a logic "AND" circuit 21 comprising three separate toroids 41, 42 and 43; each of the toroids 41, 42 and 43 is similar to toroid 19 of FIG. 4.

As is known, the mathematical function of an "AND" circuit may, for example, be given as $A \times B \times C = X$; that is, if A and B and C are present, the "AND" circuit will indicate a given value X; whereas, if one of the factors is not present, the circuit will indicate a value other than X.

Each of the toroids 41, 42 and 43 is formed of respective wires 44, 45 and 46; a magnetic material 47, 48 and 49 is coated on the periphery of toroids 41, 42 and 43, respectively, as discussed above. An input winding 53 is wound in common around a length of all three of the toroids 41, 42 and 43 such that a magnetic flux field $\phi$ is provided by the winding 53 to each of the toroids 41, 42 and 43 as discussed above. Likewise, an output winding 55 is arranged in spaced relation to input winding 53 and is wound in common around a length of all three of the toroids 41, 42 and 43 to be responsive to the magnetic flux field $\phi$ developed in each of the three toroids 41, 42 and 43 as also discussed above. An alternating current (hereinafter abbreviated A.C.) input signal is coupled to each of the wires 44, 45 and 46; more specifically, an A.C. input signal $I_A$ is coupled to wire 44 of toroid 41 from a suitable source 30A; an A.C. input signal $I_B$ is coupled to wire 45 of toroid 42 from a suitable source 30B, and an A.C. input signal $I_C$ is coupled to wire 46 of toroid 43 from a suitable source 30C.

Figure 5:
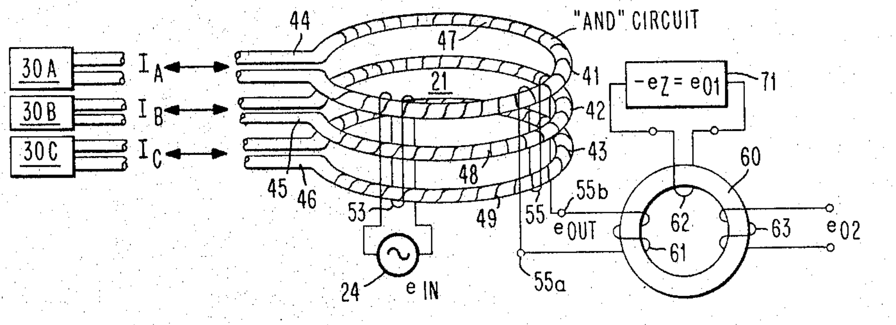
FIG. 5 is a schematic showing of a logical "AND" circuit formed in accordance with the invention.

The operation of the "AND" circuit of FIG. 5 is as follows: The input winding 53 is energized from source 24 to have an A.C. driving current flowing therethrough to induce a magnetic flux field $\phi$ in each of toroids 41, 42 and 43; the magnetic flux field $\phi$ of each of toroids 41, 42 and 43 will have lines of force traversing the toroids in the direction parallel to the axes of the toroids, as discussed above. If all of the toroids 41, 42 and 43 are energized by their respective A.C. input signals, $I_A$, $I_B$ and $I_C$ to provide a respective magnetic cross-field $\phi_x$, then the voltage $e$ OUT developed across terminals *55a* and *55b* of the output winding 55 drops to a relatively low value, that is, it drops to approximately zero volts. If one or more of the A.C. input signals, $I_A$, $I_B$ or $I_C$ are not applied (not present), then the voltage $e$ OUT developed across terminals *55a* and *55b* of the output winding 55 will be of a relatively high amplitude. In other words, all of the A.C. input signals $I_A$, $I_B$ and $I_C$ must be applied to provide a magnetic cross-field flux $\phi_x$ of sufficient strength to reduce the effective magnetic field $\phi$ in each of the toroids 41, 42 and 43 to thereby decrease the output voltage $e$ OUT developed in output winding 55 to approximately zero volts. If one of the A.C. input signals $I_A$, $I_B$ or $I_C$ is not applied, the associated toroid 41, 42 or 43 will not have a magnetic cross-field $\phi_x$ developed therein; consequently, in that toroid in which an A.C. input signal is not applied, a relatively high magnetic flux field $\phi$ will be developed (refer again to FIG. 2) and a relatively high amplitude voltage $e$ OUT will be developed across the output winding 55.

Thus, if in the "AND" circuit 21, all the A.C. input signals $I_A$, $I_B$ and $I_C$ are applied, the output voltage $e$ OUT developed across the terminals *55a* and *55b* of output winding 55 will be approximately zero volts. Logically speaking, if A and B and C are present, "AND" circuit 21 provides a 0 (zero) volt output. When one or more of the A.C. input signals $I_A$, $I_B$ and $I_C$ are *not* applied, the output voltage $e$ OUT developed across the terminals *55a* and *55b* of output winding 55 will be a voltage having some absolute value other than zero. Logically then, if A and B and C are not all present, "AND" circuit 21 provides an output other than 0 (zero) volts.

The output winding 55 of the logic "AND" circuit 21 may be connected directly to a utilization device, not shown. However, to obtain a real output (that is, not zero) from the "AND" circuit 21 when all the A.C. input signals $I_A$, $I_B$ and $I_C$ are applied to it, a magnetic core 60 may be connected to the output winding 55 of "AND" circuit 21; magnetic core 60 functions as an inverter. In other words, to obtain the equivalent of a binary "1" when the "AND" function is satisfied, and the equivalent of a binary "0" when the "AND" function is not satisfied, the inverter core 60 is utilized. Magnetic core 60 has a bias winding 62, an input winding 61 which is coupled across the terminals *55a* and *55b* of winding 55 of "AND" circuit 21, and an output winding 63. The bias winding 62 has a voltage $-e_z$ applied thereto from a suitable biasing source 71. The biasing voltage $-e_z$ is arranged to have a relation such that $-e_z = e_{01}$;

where $e_{01}$ is the specific output voltage $e$ OUT obtained across terminals *55a* and *55b* of winding 55, under the conditions when one or more of the A.C. input signals $I_A$, $I_B$ and $I_C$ are *not* applied to their respective toroids 41, 42 and 43.

The inverting operation of the magnetic core 60 in conjunction with "AND" circuit 21 is as follows. When all three A.C. input signals, that is $I_A$, $I_B$ and $I_C$ are applied to their respective toroids 41, 42 and 43, the magnetic coatings 47, 48 and 49 on each of the three toroids 41, 42 and 43 are saturated by the magnetic cross-flux field $\phi_x$; therefore, the output voltage $e$ OUT developed across winding 55 drops to approximately zero value; when this occurs, the voltage $e_{01}$ no longer balances the biasing voltage $-e_z$, and the biasing voltage $-e_z$ drives core 60, i.e., shifts core 60, to saturation in a given direction. This, in turn, induces a voltage $e_{02}$ across output winding 63 of core 60; voltage $e_{02}$ thus appears as an absolute voltage other than zero across winding 63. This, in effect, provides the functional "AND" condition $A \times B \times C = 1$. Conversely, when one of the A.C. input signals $I_A$, $I_B$ and $I_C$ *is not* applied, the voltage $e$ OUT developed across terminals *55a* and *55b* of winding 55 equals, that is, balances the biasing voltage $-e_z$ and the magnetic state of core 60 is not changed; consequently, the voltage $e_{02}$ appears as a zero voltage across output winding 63 of core 60. This, in effect, provides the functional "AND" condition $A \times B \times C = 0$. Thus as indicated above, by utilizing the inverting function of core 60, "AND" circuit 21 will provide a real output when the "AND" function is satisfied and a zero output when the "AND" function is not satisfied.

"OR" CIRCUITS

A logic circuit providing an "OR" function is shown in FIG. *6a*. As is known, mathematically the function of the "OR" circuits of FIGS. *6a* and *6b* may, for example, be given as: $A + B + C = X$; that is, if any of the factors A or B or C are present, then the "OR" circuit will indicate a value X; whereas, if none of the three factors are present, the "OR" circuit will indicate a value other than X.

The structure of an "OR" circuit 58 formed in accordance with the invention is depicted in FIG. *6a*, which shows a toroid 64 comprising a single wire 65 having a magnetic material 69 wound thereon similarly to the structure of FIG. 4. The input A.C. signals $I_A$, $I_B$ and $I_C$ from sources such as 30A, 30B and 30C, as shown in FIG. 5, are respectively applied to three separate conductive lines or leads 66, 68 and 72, which lines are connected in common to the input terminal 65A of the wire 65 of the toroid 64. The output terminal 65B of wire 65 is shown as being connected to ground reference as is well known in the art. As in FIG. 4, an input winding 73 is wound around a length of toroid 64 and arranged to be connected to the A.C. source 24; and, an output winding 74 arranged in spaced relation to input winding 73 is also wound around a length of toroid 64 and is arranged to be connected to an output magnetic core 60 in the same manner as the circuit of FIG. 5. The operation of the circuit of FIG. 6*a* will be discussed below after a second embodiment of the "OR" circuit is described.

A second embodiment of an "OR" circuit is shown in FIG. 6*b*. In the "OR" circuit 59 of FIG. 6*b*, a coating 67 of a magnetic material is formed or wound around three separate wires 75, 76 and 77, which are arranged to form a toroid 70; the coating 67 provides a common magnetic coating for the three wires. The A.C. input signals $I_A$, $I_B$ and $I_C$ from sources such as 30A, 30B and 30C, as shown in FIG. 5, are respectively applied to wires 75, 76 and 77. An input winding 78 and output winding 79 are arranged in spaced relation to one another and each is wound around a length of the toroid 70 (and the magnetic coating 67). An A.C. voltage *e* IN is applied to winding 78 from source 24 and an A.C. voltage *e* OUT is obtained across terminals 79*a* and 79*b* of winding 79, as will be discussed hereinbelow.

The operations of the "OR" circuits in FIGS. 6*a* and 6*b* are identical; for explanation purposes, reference will be made to FIG. 6*a*.

Referring to FIG. 6*a*, if one of the A.C. input signals $I_A$, $I_B$ or $I_C$ is applied to its respective wire 66, 68 or 72, then the magnetic cross-field $\phi_x$ developed in the toroid 64 is of a relatively high magnitude. Therefore, in this case, the magnetic field $\phi$ induces in toroid 64 (by the current flowing in input winding 73) as a result of an applied voltage *e* IN will be of a relatively low magnetic strength; consequently, the voltage *e* OUT obtained across terminals 74*a* and 74*b* of output winding 74 is approximately of zero amplitude. In other words, if a given A.C. voltage *e* IN is applied to winding 73, and if any one of the A.C. input signals $I_A$, $I_B$ or $I_C$ is applied, then the output voltage *e* OUT is approximately zero. Logically speaking, if A or B or C are present, "OR" circuit 58 provides a 0 (zero) volt output. Conversely, if none of the A.C. input signals $I_A$, $I_B$ or $I_C$ is applied, then the applied voltage *e* IN (and the resultant current flow in winding 73) will develop a magnetic field $\phi$ in toroid 64 of a relatively high magnitude; consequently, the voltage induced across output terminals 74*a* and 74*b* of winding 74 will be of a relatively high magnitude, that is, a value other than zero. Logically then, if none of the factors A or B or C are present, "OR" circuit provides an output other than 0 (zero).

As noted above, the operation of FIG. 6*b* is identical to the operation of FIG. 6*a*.

The output windings 74 and 79 of the logic "OR" circuits 58 and 59 of FIGS. 6*a* and 6*b* may be connected directly to a utilization device, not shown. However, as discussed above in relation to the "AND" circuit 21 of FIG. 5, to obtain a real output from the circuits of FIGS. 6*a* and 6*b*, that is, to obtain a voltage other than 0 (zero) when the "OR" condition is satisfied and a 0 (zero) voltage when the "OR" condition is not satisfied, an inverter circuit is utilized. For this purpose, the output windings 74 and 79 of the "OR" circuits 58 and 59 may each be respectively connected to a magnetic core identical in circuitry and operation to the magnetic core 60 in FIG. 5.

Referring to FIG. 6*a*, the output voltage *e* OUT developed across output winding 74 of the "OR" circuit 58 is coupled to input winding 61 of core 60. When one of the A.C. input signals $I_A$, $I_B$ or $I_C$ is applied and consequently reduces the output voltage *e* OUT to approximately 0 (zero), the biasing voltage $-e_z$ applied to core 60 will not be balanced by the output voltage *e* OUT and the magnetic state of core 60 will be shifted by the biasing voltage $-e_z$; a voltage $e_{02}$ pulse will thus be developed across the output winding 63 of core 60. Thus, a voltage $e_{02}$ which is of an amplitude other than zero will appear across the output winding 63 of core 60 to indicate that the functional "OR" condition has been satisfied. Logically, this indicates the "OR" condition $A+B+C=1$. Conversely, if none of the signals $I_A$, $I_B$ or $I_C$ is applied to the "OR" circuits of FIGS. 6*a* and 6*b*, the magnitude of the magnetic cross-field $\phi_x$ will be relatively low or zero; therefore, the input voltage *e* IN will develop an output voltage *e* OUT of a relatively high amplitude. This output voltage *e* OUT will balance the biasing voltage $-e_z$ and the magnetic state of core 60 will not be shifted by the biasing voltage $-e_z$; consequently, the output voltage $e_{02}$ obtained across winding 63 of core 60 will be zero volts indicating that the "OR" functional condition has not been satisfied. Logically, this indicates the "OR" condition $A+B+C=0$.

It will be appreciated that "AND" and "OR" circuits having three inputs or input signals (factors) are shown as examples; however, the number of inputs is essentially unlimited and will be determined by the logic requirements. It will readily be understood that in the "AND" circuit 21 of FIG. 5, a toroid similar to each of toroids 41, 42 and 43 must be provided for each input; in the "OR" circuit of FIG. 6*a*, only the input connections must be changed to accommodate more or fewer inputs; and, in the "OR" circuit of FIG. 6*b*, a toroid similar to toroids 75, 76 and 77 must be provided for each input.

While the invention has been particularly shown and described with reference to preferred embodiments thereof, it will be understood by those skilled in the art that the foregoing and other changes in form and details may be made therein without departing from the spirit and scope of the invention.

What is claimed is:

A logic "AND" circuit comprising:

(a) a plurality of conductors;

(b) a magnetic coating formed on each of said conductors;

(c) means for selectively applying a signal current to each of said conductors, each of said signal currents developing a respective first magnetic field in and around the respective conductors;

(d) each said first magnetic field having lines of force which are in a direction transverse to the axis of said conductors;

(e) a first winding wound around said conductors;

(f) means for applying an alternating energizing current to said first winding for developing an alternating second magnetic field having lines of force which extend in a direction along the axes of said conductors;

(g) an output winding wound around said conductors, said output winding having an output voltage developed thereacross which is a function of the interaction of said first and second magnetic fields; whereby (h) when all of said signal currents are applied to their respective conductors said output voltage is of a first amplitude, and when one or more of said signal currents are not applied to their respective conductors said output voltage is of another amplitude;

(i) a magnetic core having first, second and third windings wound thereon;

(j) said output winding of said "AND" circuit being connected to said first winding of said core;

(k) means for coupling a biasing voltage to said second winding which balances the voltage coupled from said output winding of said "AND" circuit to said first winding of said core when the logic "AND"

function is not satisfied to thereby provide a zero voltage output across said third winding when said logic "AND" function is not satisfied; and, (l) said biasing voltage ceasing to be balanced by the voltage coupled from said output winding of said "AND" circuit to said first winding of said core when said logic "AND" condition is satisfied, whereby said biasing voltage is effective to shift the magnetic state of said core to thereby provide a real output when said logic "AND" condition is satisfied.

References Cited by the Examiner

UNITED STATES PATENTS

| | | | |
|---|---|---|---|
| 3,069,661 | 12/1962 | Gianola | 340—174 |
| 3,177,473 | 4/1965 | Schoenmakers | 340—174 |

BERNARD KONICK, *Primary Examiner.*

IRVING SRAGOW, *Examiner.*

S. M. URYNOWICZ, *Assistant Examiner.*